United States Patent [19]
Westfall

[11] Patent Number: 5,033,813
[45] Date of Patent: Jul. 23, 1991

[54] LOW LOSS FIBER OPTIC SWITCH

[75] Inventor: Raymond T. Westfall, Seminole, Fla.

[73] Assignee: James L. Downey, Tierra Verde, Fla.; a part interest

[21] Appl. No.: 489,995

[22] Filed: Mar. 7, 1990

[51] Int. Cl.⁵ .............................................. G02B 6/26
[52] U.S. Cl. ................................ 350/96.20; 350/96.16; 350/96.21; 350/96.22
[58] Field of Search ............... 350/96.10, 96.15, 96.16, 350/96.18, 96.20, 96.21, 96.22; 250/227.11

[56] References Cited

U.S. PATENT DOCUMENTS

| | | | |
|---|---|---|---|
| 4,472,052 | 9/1984 | Lofgren | 350/96.20 |
| 4,525,025 | 6/1985 | Hohmann et al. | 350/96.15 |
| 4,641,915 | 2/1987 | Asakawa et al. | 350/96.18 |
| 4,643,521 | 2/1987 | Harstead et al. | 350/96.20 |
| 4,886,335 | 12/1989 | Yanagawa et al. | 350/96.20 |
| 4,900,117 | 2/1990 | Chen | 350/96.15 |
| 4,961,622 | 10/1990 | Gorman et al. | 350/96.20 |
| 4,973,123 | 11/1990 | Lützeler | 350/96.20 |

Primary Examiner—Brian Healy
Attorney, Agent, or Firm—Edwin E. Greigg; Ronald E. Greigg

[57] ABSTRACT

Proposed is a low loss fiber optic switch which allows exclusive two way communication of data between a number of terminals and various host computers. A rotary switch mechanism allows the terminals to be connected exclusively to the selected host computers. An optical coupling fluid sealed in the switch mechanism minimizes signal losses and promotes higher data transmission rates.

20 Claims, 11 Drawing Sheets

F-F

E-E

D-D

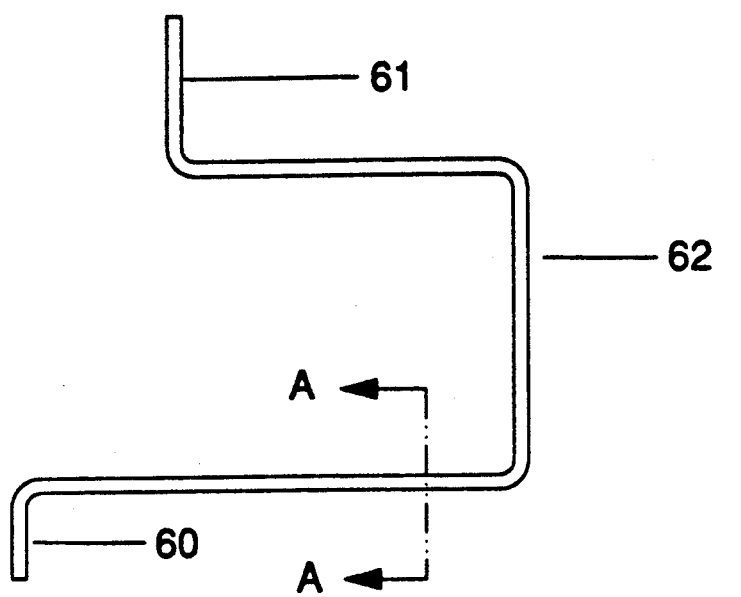
FIG.9A
A-A
FIG.9B
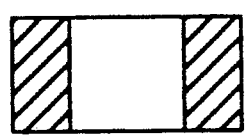
B-B
FIG.9C
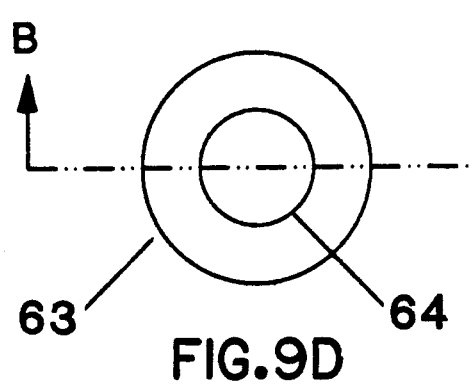
FIG.9D

C-C

LOW LOSS FIBER OPTIC SWITCH

BACKGROUND OF THE INVENTION

This invention relates to a fiber optic switch for connecting computer terminals to host computers. Many companies utilize several computer systems to accomplish various tasks. It is sometimes imperative that data from one system be maintained as confidential or proprietary while information from other systems is routinely distributed to the public at large. In such cases it is common to provide separate terminals for each system which are physically and electrically isolated from the other systems. This invention provides considerable cost savings by allowing terminals to address several host computer systems without compromising the integrity of the data contained in the host computers. The use of optical fibers eliminates unintentional communication via electromagnetic radiation emanating from communication cables and common grounds. The present invention provides exclusive two way communication between the terminal and the selected host computer. A temporary power down circuit assures that data stored in volatile RAM (Random Access Memory) in the terminal is erased as the terminal is switched from host system to host system. Fiber optic switches developed in the past have been limited in data transmission rates because of signal losses at the interface between optical fibers in the switch. This invention overcomes those limitations by means of a fluid trapped in a cavity between opposing ends of the optical fibers. The fluid, in intimate contact with the ends of the fibers, has the same optical properties as the central core of the fibers themselves and is thus fully transparent to the light emerging from one fiber and entering the other. This invention also eliminates the need to optically polish the ends of the fibers and thereby saves time and expense during installation. This invention represents the most effective means of establishing a nearly lossless switchable optical connection.

OBJECT AND SUMMARY OF THE INVENTION

An object of this invention is to provide a switch selectable means of establishing an optical connection for bi-directional communication between a computer terminal and any of several host computers.

Another object of this invention is to provide a mechanical display which indicates the absolute position of the switch.

Another object of this invention is to provide a nearly lossless optical connection between the terminal and any of several host computer systems by means of a fluid captured between the ends of opposed optical fibers in the switch mechanism. The index of refraction of the fluid closely matches the index of refraction of the core material of the optical fiber. As a result, the optical interface between the fibers is nearly lossless. The data transmission rate through an optical system is a function of the system losses, therefore, the lower losses provided by this invention result in correspondingly higher data transmission rates.

Another object of this invention is to eliminate the need to polish the ends of the fibers when establishing connections. The optical coupling fluid is able to wet the unpolished surface of the ends of the optical fibers and establish intimate contact with the entire surface, even the smallest cracks and crevices. Since the optical properties of the fluid closely match the optical properties of the fiber core, very little light is scattered at the interface.

Another object of this invention is to eliminate the need for the intimate mechanical contact between the opposing optical fibers in a rotary optical switch by incorporating a relatively low viscosity coupling fluid between them. The possibility of mechanical abrasion of the ends of the fibers caused by rotation of the switch members is thereby eliminated.

Another object of this invention is to provide a key actuated tumbler mechanism to operate the optical switch thereby assuring that only authorized personnel are able to utilize the switch.

A further object of this invention is to provide a means of erasing the contents of any volatile memory in the terminal as it is switched from one host computer system to another. This is accomplished by means of a timer circuit which deenergizes the terminal and maintains it in the deenergized condition for a predetermined period of time (long enough for the volatile memory to be erased) as the terminal is switched from one system to another.

BRIEF DESCRIPTION OF THE DRAWINGS

FIG. 9A is the top view of one of the Indicator Levers, (12), shown in FIG. 1.

FIG. 9B is a cross-sectional side view of one of the Indicator Levers, (12), shown in FIG. 1.

FIG. 9C is the top cross-sectional view of the Stator Bushing, (13), shown in cross-section in FIG. 1.

FIG. 9D is a front view of the Stator Bushing, (13), shown in cross-section in FIG. 1.

DESCRIPTION OF THE PREFERRED EMBODIMENT

A preferred embodiment of the fiber optic switch uses rotary motion to switch the connection between one pair of optical fibers and a selected pair of other optical fibers. This particular embodiment of the invention provides for connecting one computer terminal to either of two host computers. Of course, more than two host computers could be accommodated and devices other than computers could be selectively interconnected using the invention.

Figure 1:
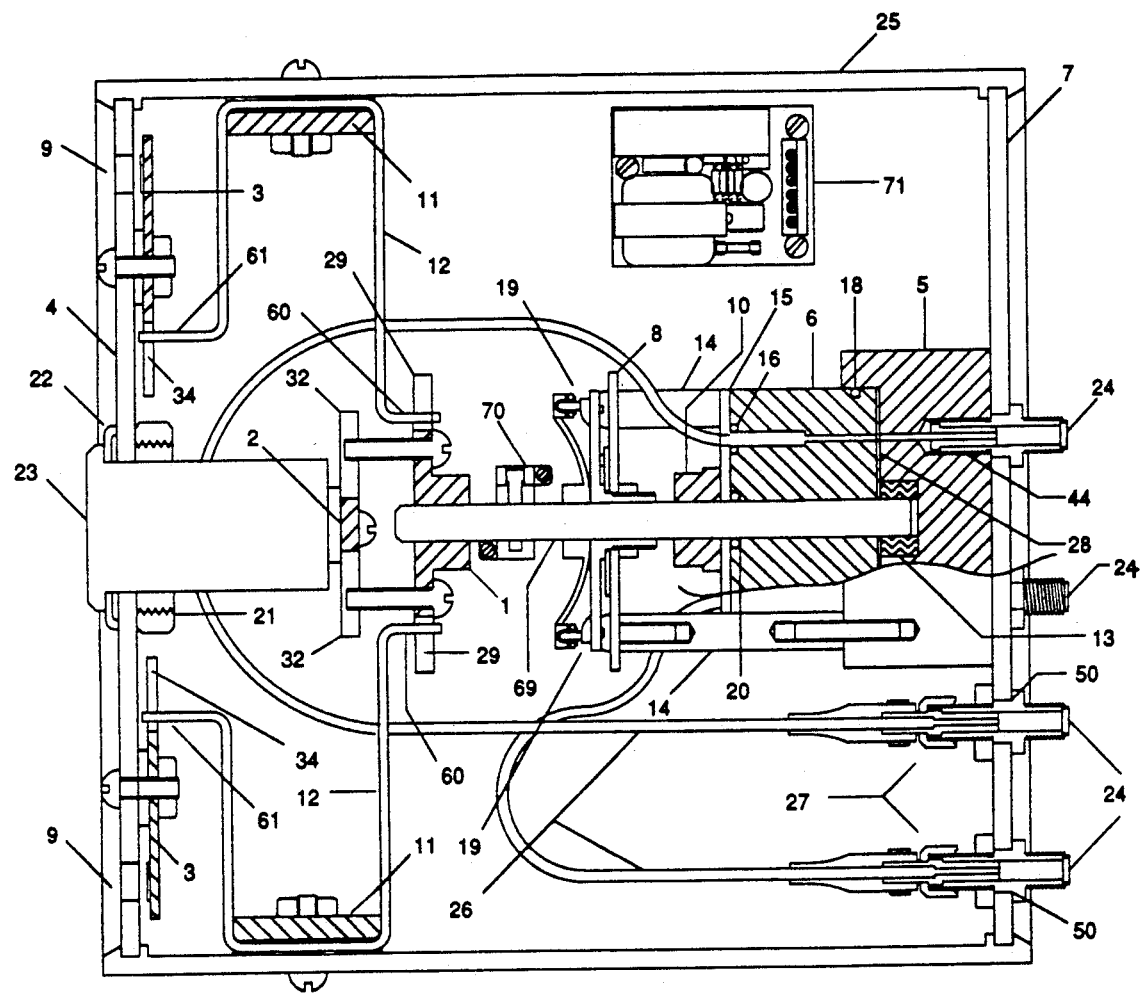
FIG. 1 is a side view, (partial crosssection), of one embodiment of the present invention.

A clear understanding of the present invention is best achieved by careful consideration of the partial cross-sectional top view of the rotary optical switch illustrated in FIG. 1. The switch mechanism is enclosed in a plastic housing 25 which holds a front panel 4 and a rear panel 7 by means of grooves in the housing. All attachments are made to the bottom half of the housing so that the top half may be easily removed.

Figure 4A:
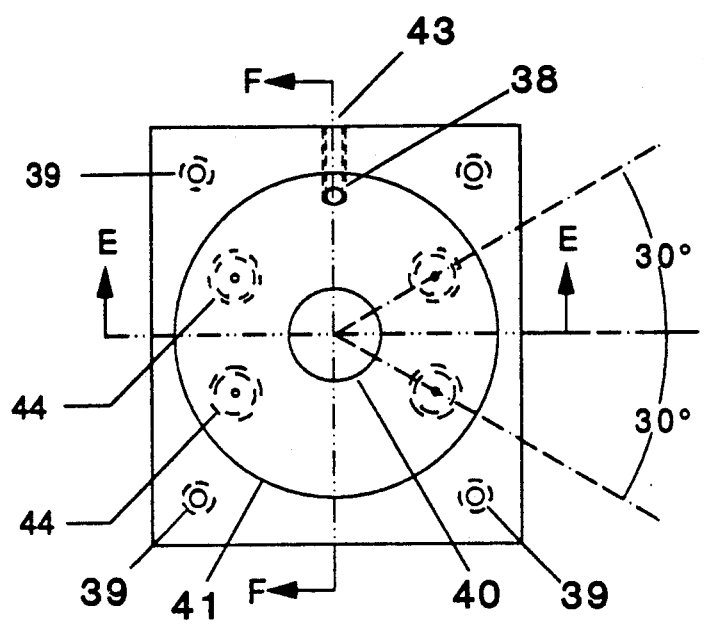
FIG. 4A is a front view of the Optical Switch Stator, (5), shown in partial cross-section in FIG. 1.
Figure 4B:
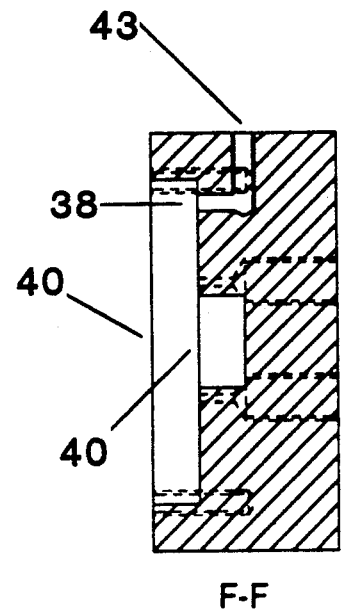
FIG. 4B is a cross-sectional side view of the Optical Switch Stator, (5), shown in partial cross-section in FIG. 1.
Figure 4C:
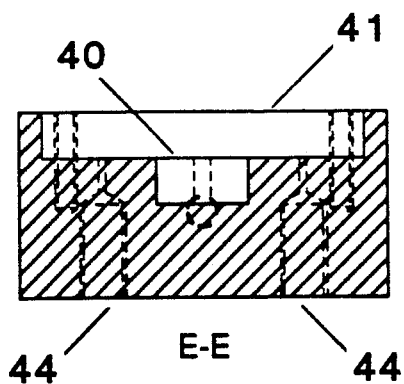
FIG. 4C is a bottom cross-sectional view of the optical Switch Stator, (5), shown in partial cross-section in FIG. 1.
Figure 5A:
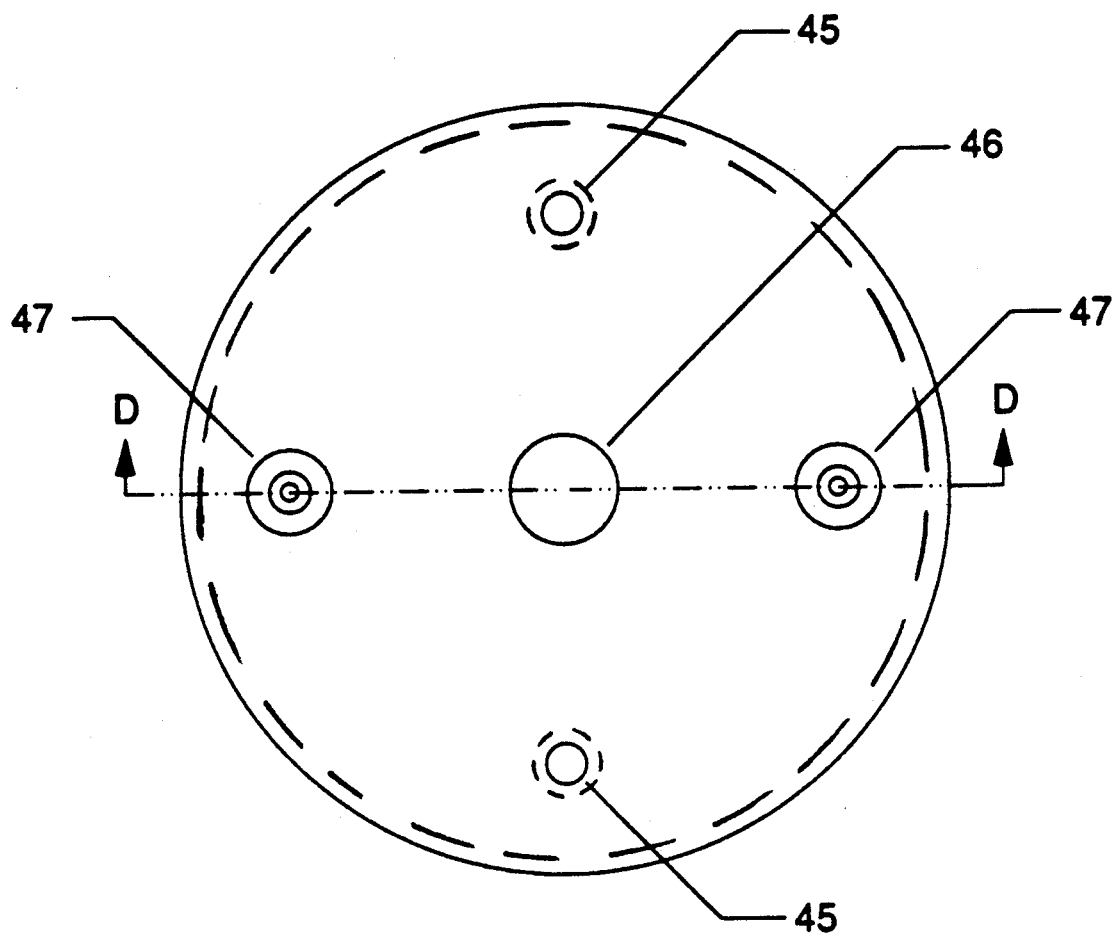
FIG. 5A is the front view of the Optical Switch Rotor, (6), shown in partial cross-section in FIG. 1.
Figure 5B:
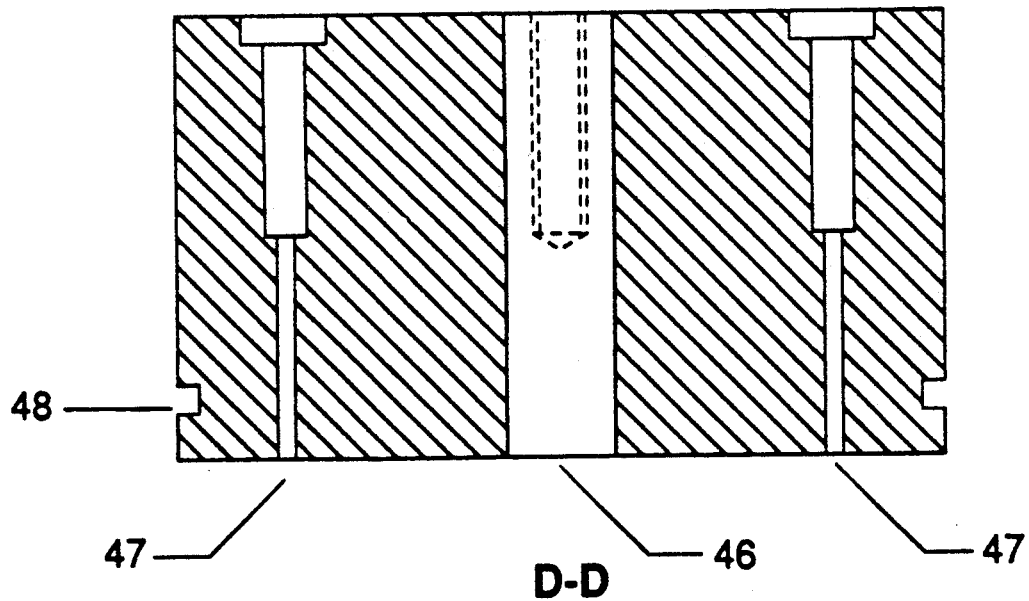
FIG. 5B is a bottom cross-sectional view of the Optical Switch Rotor, (6), shown in partial cross-section in FIG. 1.

The heart of this embodiment of the invention is the rotary optical switch itself. It is comprised principally of two pieces, the Stator 5, and the Rotor 6. Stator 5 is mounted on the rear panel 7 which can be seen at the right side of FIG. 1. Detailed views of stator 5 are shown in FIGS. 4A, 4B and 4C. It can be seen that stator 5 contains four holes 44 through which four optical fibers coming from the two host computers (not shown) will pass. As can be seen in FIG. 4A, the four holes 44 are arranged in two pairs with each pair including two diametrically opposed holes. It can also be seen that lines joining each pair of holes 44 are spaced 60 apart. FIGS. 5A and 5B show that rotor 6 includes two diametrically opposed holes 47 which can be rotated 30° clockwise or counter-clockwise from a center position so that the pair of holes 47 can be brought selectively into alignment with one or the other pair of holes 44 on Stator 5. Four optical fibers (not shown) from the host computers enter stator 5 from the rear of the optical switch through four fiber optic couplings and pass through the four holes 44 in stator 5 and terminate flush with the mating surface in circular recess 41 in stator 5. The circular recess 41 in stator 5 is shaped to receive rotor 6 which includes the two holes 47 through which two flexible optic fibers 26, FIG. 1, coming from the terminal (not shown) can pass. The two holes 47 in rotor 6 which accommodate these two fibers 26 are shown in FIG. 5A. It should be clear that rotor 6 can be rotated between two positions so that the pair of optical fibers 26 from the terminal are aligned with either one of the pairs of optical fibers from the host computers.

In the preferred embodiment of the invention testing has shown that the SK Series 1.0 mm fiber produced by Mitsubishi Corporation works best.

One feature of the invention is the inclusion of coupling fluid in the coupling cavity 28 between the opposing faces of rotor 6 and stator 5. This coupling fluid has optical properties substantially the same as that in the optical fibers so that a low loss optical connection is made between the opposing optical fibers. In the preferred embodiment of the invention, testing has shown that the best optical fluid for this fiber is Formula Code 5610 Catalog No. 20130, of R.P. Cargille Laboratories in New Jersey.

To assure that only authorized persons are able to utilize the fiber optic switch, the rotation of rotor 6 is controlled by a key operated lock tumbler in tumbler body 23, FIG. 1. When the key is rotated to a 30° clockwise or counter-clockwise detent position, its rotation is transmitted through shaft 69 to rotor 6 and the desired optic fiber alignment is achieved.

In order to indicate on front panel 4 which host computer is currently connected via the optical switch to the terminal, the rotation position of shaft 69 is shown by indicator wheels 3, FIG. 1, which show through viewing ports 9 on the front panel 4. The rotation of shaft 69 causes the indicator wheels 3 to be turned by means of indicator levers 12, FIG. 1. Levers 12 are rotatably mounted in fulcrum plates 11. When shaft 69 is rotated, its motion is communicated to levers 12 by means of radial slots 29 in index wheel 1 in which the rearward ends 60 of levers 12 ride. The forward ends 61 of levers 12 ride in radial slots 34 in indicator wheels 3. When index wheel 1 turns with shaft 69 it pushes ends 60 of levers 12. The ends 61 of levers 12 then push indicator wheels 3 to cause them to rotate. Each indicator wheel 3 is colored red and black, so that when the key is rotated to its 30. clockwise detent position, the right hand viewing port 9 shows red and the left hand viewing port 9 shows black. When the key is rotated to its 30 counter-clockwise detent position, the left hand port shows green and the right hand port shows black.

Figure 7:
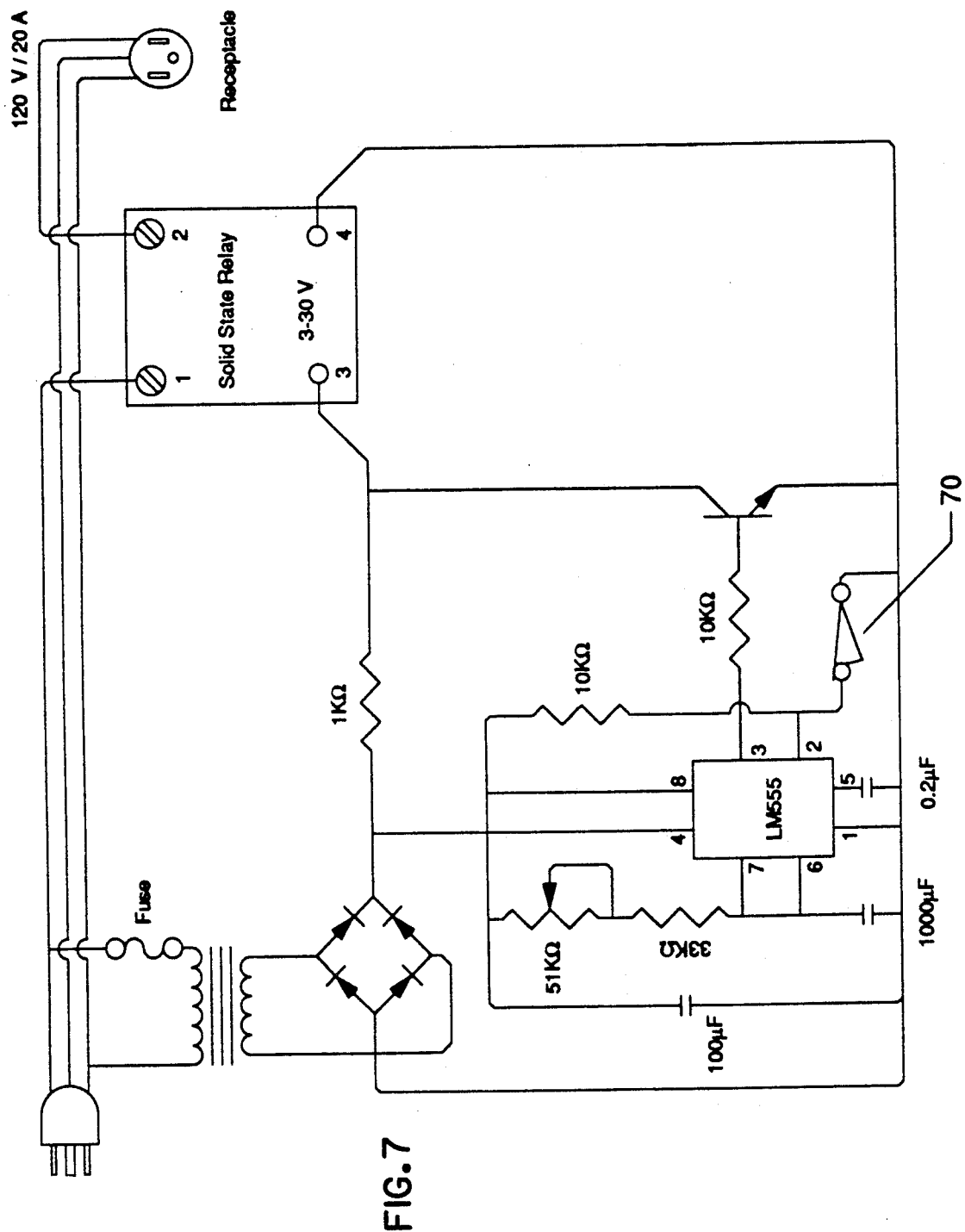
FIG. 7 is a schematic diagram of the electronic timing circuit.

As another safety feature, in addition to requiring a key to operate the optical switch, an electric switch 70, FIGS. 1 and 7, is arranged to temporarily remove power from the terminal whenever the key is in its center or off position.

Figure 6A:
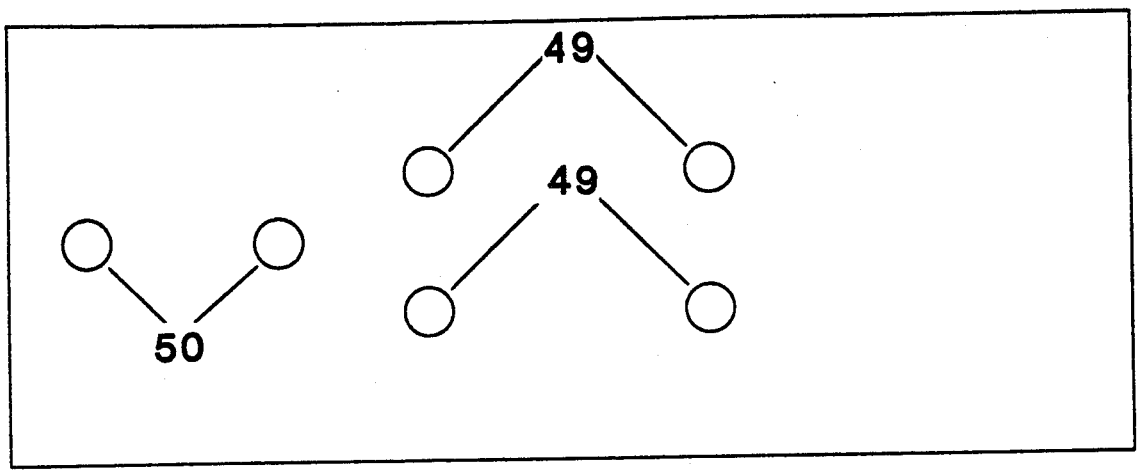
FIG. 6 is the rear view of the Rear Panel, (7), shown in cross-section in FIG. 1.
FIG. 6B is the rear view of the Index Plate, (8), shown in cross-section in FIG. 1.
Figures 10A, 10B, 10C:
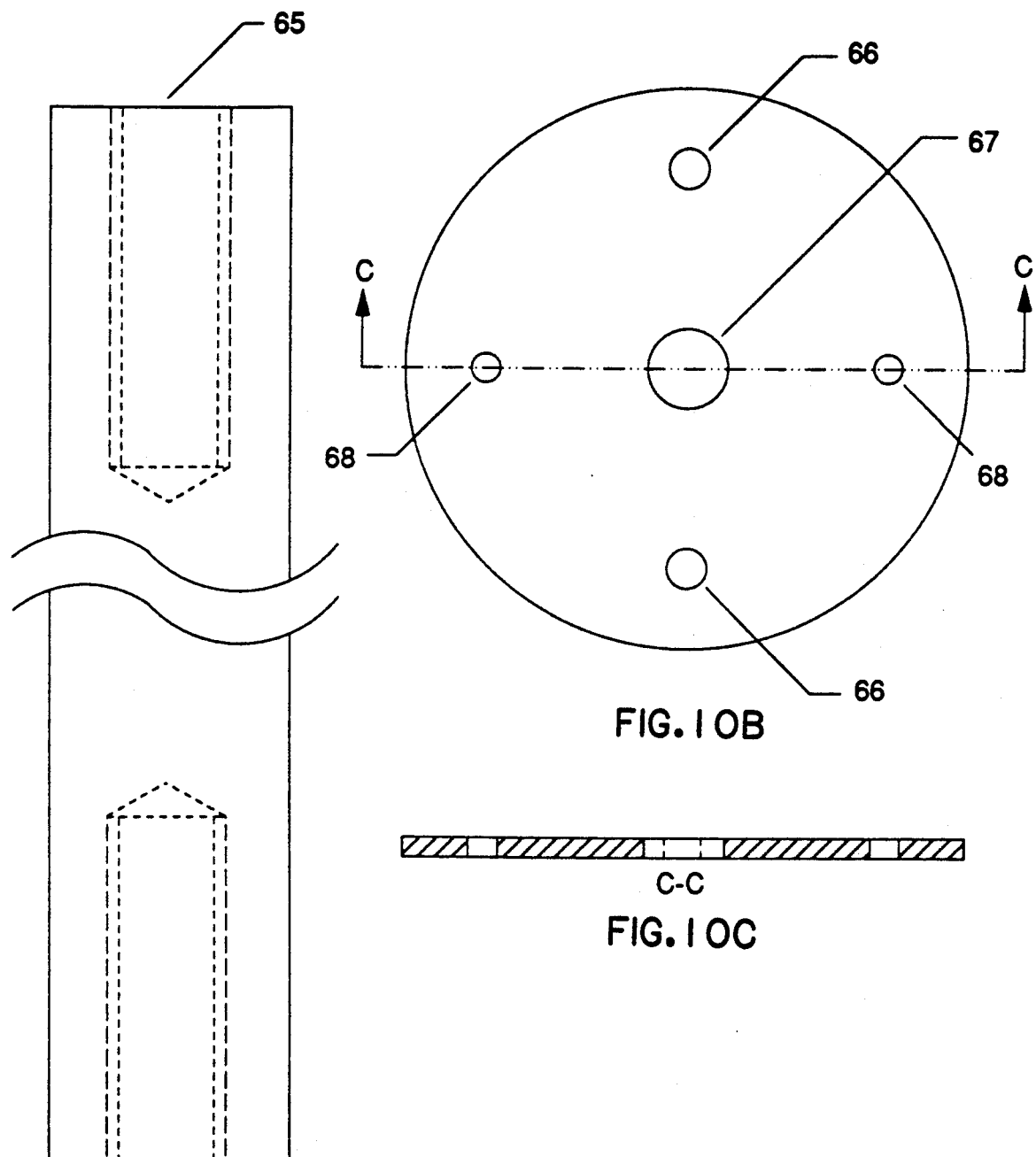
FIG. 10A is the top view of one of the Index Mechanism Stand-offs, (14), shown in FIG. 1.
FIG. 10B is the front view of the Rotor "O" Ring Compression Plate, (15), shown in cross-section in FIG. 1.
FIG. 10C is the bottom cross-sectional view of the Rotor "O" Ring Compression Plate, (15), shown in cross-section in FIG. 1.

A more detailed description of the preferred embodiment will now be given. The stator 5 is secured to the rear panel by means of four externally threaded fiber optic couplings 24, two of which can be seen in FIG. 1, which fit through holes 49, in the rear panel 7, FIG. 6A, and screw into internally threaded holes 44, FIG. 4, in the back of the stator. The couplings 24 serve several purposes. They provide convenient terminations for the optical fibers at the rear of the switch, they secure the stator to the rear panel, and they compress the elastomer seal around the portion of optical fiber entrapped in the stator thus preventing the coupling fluid located in the coupling cavity 28, FIG. 1, from escaping by this path. The coupling fluid is further contained by the "O" rings 16, 18 and 20, FIG. 1. The "O" rings on the front face of the rotor are compressed by means of the rotor "O" ring compression plate 15 FIG. 1, FIG. 10B, and FIG. 10C. The "O" ring in the rotor is contained within its own groove 48, FIG. 5. The index mechanism shaft 69 passes through hole 67, FIG. 10B, and the optical fibers pass through holes 68. After the rotary optical switch is assembled, the coupling fluid is introduced into the threaded filling hole 43, FIG. 4A and FIG. 4B, where it flows through the orifice 38 into the coupling cavity 28. The fluid is then sealed in the coupling cavity by installing the sealing screw in the filling hole.

Figure 6B:
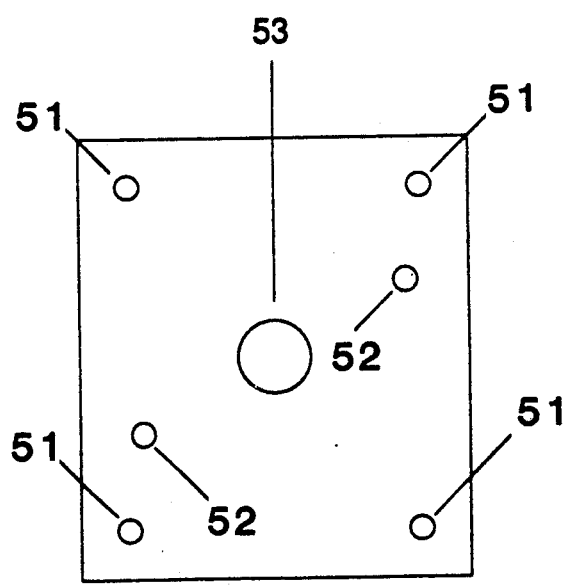
Figure 8A:
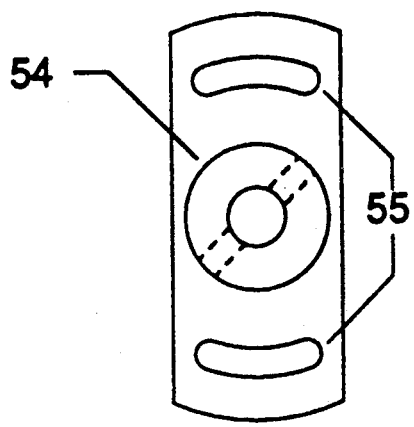
FIG. 8A is the front of the Adjustment Lock, (10), shown in cross-section in FIG. 1.
Figure 8B:
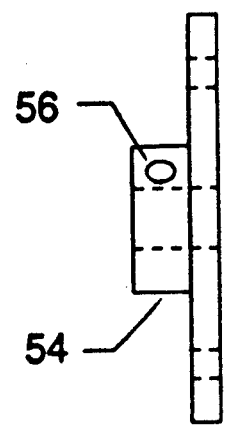
FIG. 8B is a side view of the Adjustment Lock, (10), shown in FIG. 1.

The portion of optical fiber which is entrapped in the stator extends from the center of the optical fiber coupling through the hole in the stator where it terminates flush with the surface of the coupling cavity 28. Accurate alignment is maintained by the stator bushing 13, FIG. 1. The outside diameter 63, of the stator bushing, FIG. 9C and 9D, fits snugly into the cavity 40, in stator 5, FIG. 4, and the inside diameter 64, FIG. 9 D, fits snugly over the index mechanism shaft 69, FIG. 1, of the three positions, 30° step, rotary switch index mechanism 19, FIG. 1. Studs are inserted into the mounting holes 39, FIG. 4, and attach the index mechanism stand-offs 14, FIG. 10A, by means of the threaded holes 65, FIG. 10A. The index plate 8, FIG. 1, is attached to the other ends of the four index mechanism stand-offs by means of screws through holes 51, FIG. 6B. The plate supports the three position, 30° step, rotary switch index mechanism 19, FIG. 1, by a threaded shaft bushing in hole 53, FIG. 6B. Proper alignment of the index mechanism is assured by attaching the index mechanism to the plate with screws through holes 52, FIG. 6B. The alignment of the index plate with the stator is established by the index mechanism stand offs. Precision alignment is achieved by the adjustment lock 10, FIG. 1. The hub 54, FIG. 8A and FIG. 8B, of the lock is attached to the shaft of the index mechanism by a roll pin through hole 56, FIG. 8B, and a corresponding hole through the shaft. The locking screw is inserted through slot 55, FIG. 8A, hole 66, FIG. 10B, into threaded hole 45, FIG. 5A. It serves two purposes: it fixes the angular relationship of the index mechanism shaft 69 with the rotor, and it compresses "O" rings 16 and 20, FIG. 1.

Figures 2A, 2B:
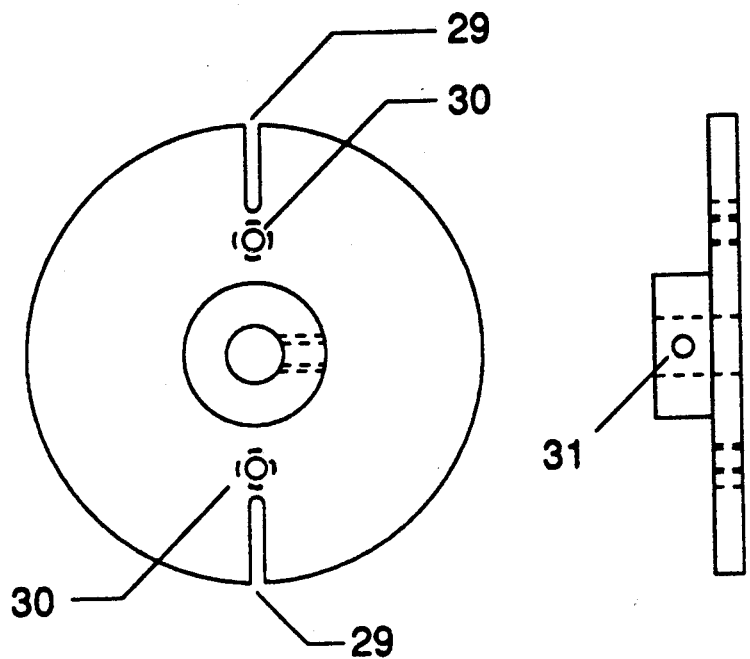
FIG. 2A is a rear view of the Index Wheel, (1) shown in cross-section in FIG. 1.
FIG. 2B is a top view of the Index Wheel, (1) shown in cross-section in FIG. 1.
Figures 2C, 2D:
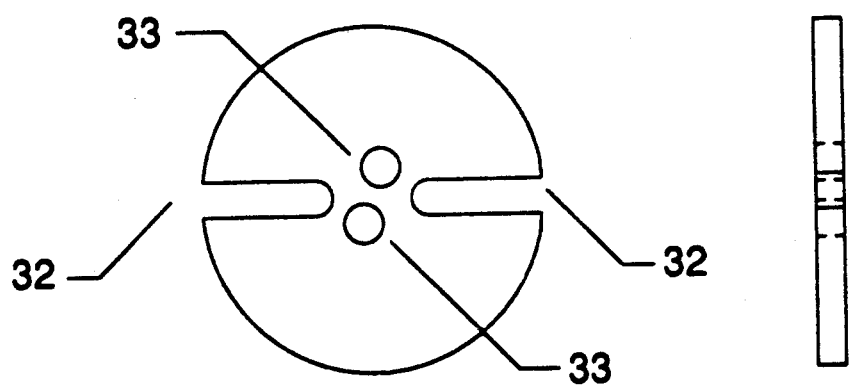
FIG. 2C is a rear view of the Lock Wheel (2), shown in cross-section in FIG. 1.
FIG. 2D is a top view of the Lock Wheel, (2), shown in cross-section in FIG. 1.
Figures 3A, 3B:
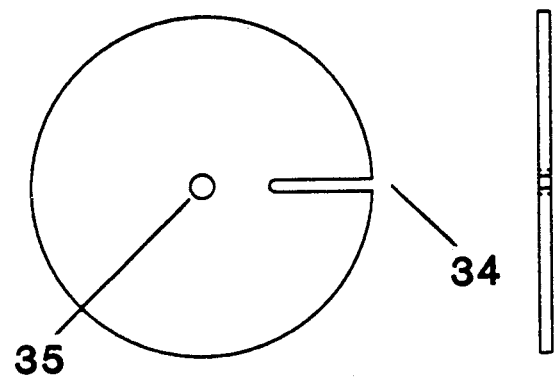
FIG. 3A is the front view of one of the Indicator Wheels, (1), shown in FIG. 1.
FIG. 3B is a side view of one of the Indicator Wheels, (3), shown in FIG. 1.
Figure 3C:
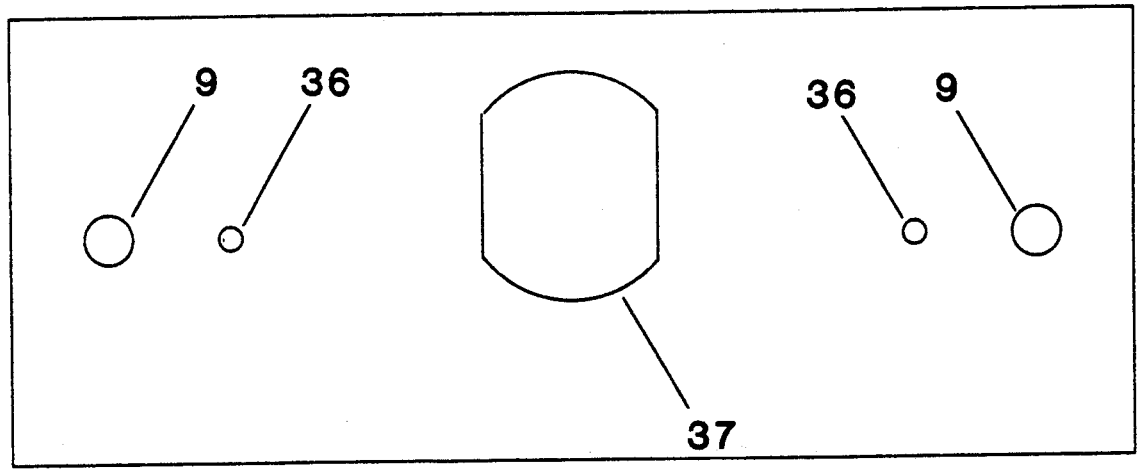
FIG. 3C is the front view of the Front Panel, (4) shown in cross-section in FIG. 1.

The index mechanism is actuated by a key operated lock tumbler. The tumbler body 23, FIG. 1, and tumbler body bezel 22 are secured to the front panel by means of the tumbler body retaining nut 21. Rotation of the tumbler body within the front panel is prevented by the truncated circular hole 37, FIG. 3C. The lock wheel 2, FIG. 1, is attached directly to the rear surface of the tumbler by screws through holes 33, FIG. 2C. The tumbler is not directly attached to the index mechanism but rotary motion is transmitted through the rotary coupling screws which loosely engage the slots 32, FIG. 2, of the lock wheel. The rotary coupling screws are threaded through holes 30, FIG. 2A, and FIG. 2B in the index wheel 1, FIG. 1. The index wheel is secured to the shaft of the index mechanism by a set screw threaded into hole 31, FIG. 2B, and tightened against a flat spot on the shaft 69.

Figure 8C:
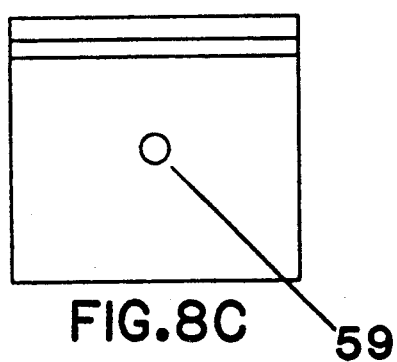
FIG. 8C is a side view of one of the Fulcrum Plates, (11), shown in cross-section in FIG. 1.
Figure 8E:
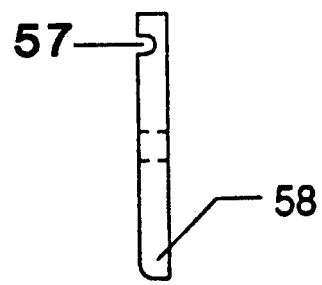
FIG. 8E is a front view of one of the Fulcrum Plates, (11), shown in cross-section in FIG. 1.
Figure 8D:
FIG. 8D is a bottom view of one of the Fulcrum Plates, (11), shown in cross-section in FIG. 1.

The position of the fiber optic switch is displayed by means of a pair of indicator levers 12 and a pair of rotating wheels 3. The indicator levers 12, FIG. 1, are mounted for rotation in fulcrum plates 11. The indicator levers 12, FIG. 1, engage, in the region 61, FIG. 1 and FIG. 9A, the index wheel via loosely fitting slots 29, FIG. 2A, and FIG. 2B. The fulcrum plates 11, FIG. 1, are attached to the bottom sides of the housing by screws which penetrate through holes 59, FIG. 8C. The bottom corners of the plates are radiuses 58, FIG. 8E, to fit against the inside of the housing and the indicator levers are loosely captured in the region 62, FIG. 9A, by the full radius grooves 57, FIG. 8D and FIG. 8E. The other ends of the levers in the region 60, FIG. 9A, engage loosely fitting slots 34, FIG. 1, FIG. 3A, and FIG. 3B on the indicator wheels 3, FIG. 1. The indicator wheels are attached to the front panel with screws which penetrate through holes 36, FIG. 3C, and clearance holes 35, FIG. 3A. The screws are terminated with self locking nuts which allow the indicator wheels to rotate freely. Fluorescent colored markings located at appropriate places on the front surface of the indicator wheels provide an indication of the angular position of the wheels when observed through the indicator viewing ports 9 in front panel 4, FIGS. 1 and 3C. The levers 12 maintain the angular relationship between the rotor and the indicator wheels. The fluorescent colors are arranged so that both parts show black whenever the key is in the center detent position. The center detent position represents the off position and none of the optical fibers are aligned in this position. It is also the only position where the key may be inserted or removed from the tumbler. Whenever the key is rotated 30 to the clockwise detent position, the right hand port shows red and left hand port shows black. In this position the fibers in the rotor are aligned with one pair of fibers in the stator. Whenever the key is rotated 30° to the counterclockwise detent position the left hand port shows green and the right hand port shows black. In this position the fibers in the rotor are aligned with the other pair of fibers in the stator.

The transmit and receive optical fibers from one host computer are attached to a pair of diagonally opposed fiber optic couplers which connect the stator to the rear panel. The transmit and receive optical fibers from the second host computer are attached to the corresponding positions of the other pair of diagonally opposed fiber optic couplers which connect the stator to the rear panel. The transmit and receive optical fibers from the terminal connect to the fiber optic couplers which are installed in holes 50 in the rear panel, FIG. 1 and FIG. 6A. The signals are carried to and from the rotor via flexible optical fibers 26, FIG. 1 and terminate at the fiber optic couplers on the rear panel with strain relief connectors 27.

Figure 11A:
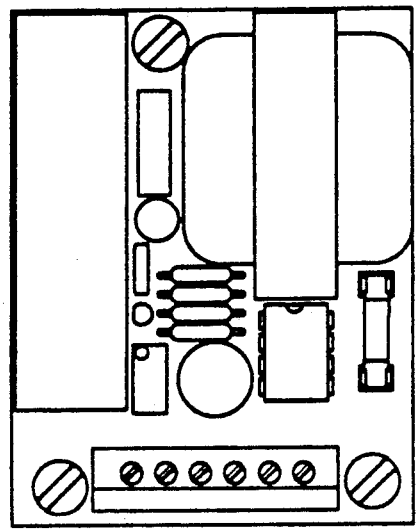
FIG. 11A is a top view of the Timer Circuit, (71), shown in FIG. 1.
Figure 11B:
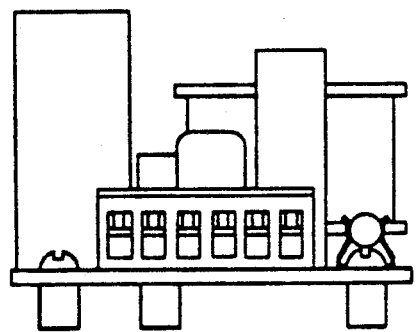
FIG. 11B is a rear view of the Timer Circuit, (71), shown in FIG. 1.

An electrical switch 70, FIG. 1 and FIG. 7, is installed so that its operating cam rides against the shaft 69 of the detent mechanism. It is de-activated whenever the key is in the center or off position. This is used to activate the timing circuit 71, FIG. 11A and FIG. 11B, which removes power from the terminal for a period of time long enough to ensure that all volatile memory in the terminal is completely erased. A schematic diagram of the timing circuit 71 is shown in FIG. 7. Although the circuit shown in the diagram is functional it is not in and of itself novel. Any commercially available timer circuit may be used in this application.

Although the present invention has been described in the form of a particular specific embodiment, it will be appreciated by those skilled in the are that various alterations and rearrangements may be made in the design without departing from the spirit and scope of this invention. It is intended that the appended claims be interpreted to cover all such modifications which fall within the spirit and scope of this invention.

What is claimed and desired to be secured by grant of United States Letters Patent:

1. A low loss fluid coupled fiber optic switch for use in making a switchable connection between at least one computer terminal and a plurality of host computers while protecting the information in said computer terminal and said host computers from unintentional disclosure, said switch comprising: at least one first optical fiber having a central core with fixed optical properties for connection to said at least one computer terminal; a plurality of second optical fibers, each having a central core with substantially the same said fixed optical properties, for connection to said plurality of host computers; relative position changing means to change the relative position between one end of said at least one first optical fiber and one end of each of said plurality of second optical fibers so that said one end of said first optical fiber is selectively opposite said one end of a selected one of said plurality of second optical fibers; an optical coupling fluid having substantially the same said fixed optical properties sealed between said one end of said first optical fiber and said one end of said selected one of said plurality of second optical fibers; and a timer circuit for connection to said at least one computer terminal which causes the erasure of any volatile memory in said at least one computer terminal whenever said relative position changing means changes the relative position of said one ends of said first and second optical fibers.

2. The low loss fluid coupled fiber optic switch of claim 1 wherein said optical coupling fluid wets said one end of said first optical fiber and said one end of said selected one of said plurality of second optical fibers.

3. The low loss fluid coupled fiber optic switch of claim 1 wherein said relative position changing means is controlled by a key.

4. The low loss fluid coupled fiber optic switch of claim 3 wherein said relative position changing means is controlled by a key actuated tumbler mechanism.

5. The low loss fluid coupled fiber optic switch of claim 1 wherein the index of refraction of said optical coupling fluid closely matches the index of refraction of the central core material of said first optical fiber and said second optical fibers.

6. A fluid coupled fiber optic switch comprising:
at least one first optical fiber having a central core with fixed optical properties and with at least one end of said at least one first optical fiber mounted on a rotor;
a plurality of second optical fibers having a central core with substantially the same said fixed optical properties and with one end of each of said plurality of second optical fibers mounted on a stator;
means to rotate said rotor relative to said stator so that said one end of said at least one first optical fiber is selectively opposite one end of a selected one of said second optical fibers; and
an optical coupling fluid, having substantially the same said fixed optical properties, trapped between said rotor and said stator so that said fluid is sealed between said one end of said first optical fiber and said one end of said selected one of said plurality of second optical fibers, said fluid being provided for conducting substantially all the light between said one end of said first optical fiber and said one end of said selected one of said plurality of second optical fibers.

7. The fluid coupled fiber optic switch of claim 6 wherein said optical coupling fluid is in intimate contact with and wets said one end of said first optical fiber and said one end of said selected one of said plurality of second optical fibers.

8. A fluid coupled fiber optic switch comprising:
at least one first optical fiber having a central core with fixed optical properties; a plurality of second optical fibers each having a central core with substantially the same said fixed optical properties; means to change the relative position of said first and second optical fibers so that one end of said first optical fiber is selectively opposite one end of a selected one of said plurality of second optical fibers; and an optical coupling fluid having substantially the same said fixed optical properties and which conducts substantially all of the light between said one end of said first optical fiber and said one end of said selected one of said plurality of second optical fibers.

9. The fluid coupled fiber optic switch of claim 8 wherein said optical coupling fluid is sealed between said one end of first optical fiber and said one end of said selected one of said plurality of second optical fibers.

10. The fluid coupled fiber optic switch of claim 8 including a timer circuit which causes the erasure of any volatile memory connected to said first optical fiber whenever said relative position changing means changes the relative position of said first and second optical fibers.

11. The fluid coupled fiber optic switch of claim 8 wherein said optical coupling fluid is in intimate contact with said two ends of said optical fibers.

12. The fluid coupled fiber optic switch of claim 11 wherein said optical coupling fluid wets said one end of said first optical fiber and said one end of said selected one of said plurality of second optical fibers.

13. The fluid coupled fiber optic switch of claim 8 wherein said relative position changing means is means to change the relative rotary position between at least one end of said at least one first optical fiber and at least one end of each of said plurality of second optical fibers.

14. The fluid coupled fiber optic switch of claim 8 wherein said relative position changing means is controlled by a key.

15. The fluid coupled fiber optic switch of claim 14 wherein said relative position changing means is controlled by a key actuated tumbler mechanism.

16. The fluid coupled fiber optic switch of claim 8 wherein said at least one first optical fiber is one of a pair of first optical fibers and said plurality of second optical fibers is a plurality of pairs of second optical fibers.

17. The fluid coupled fiber optic switch of claim 16 wherein said relative position changing means is means to change the relative rotary position between said pair of first optical fibers and said plurality of pairs of second optical fibers.

18. The fluid coupled fiber optic switch of claim 17 wherein one end of each of said pair of first optical fibers is mounted on a rotor and one end of each of said plurality of pairs of second optical fibers is mounted on a stator.

19. The fluid coupled fiber optic switch of claim 18 wherein said ends of said optical fibers of said pair of first optical fibers are mounted at diametrically opposite positions on said rotor and said ends of said optical fibers of each said plurality of pairs of second optical fibers are mounted on diametrically opposite positions on said stator.

20. The fluid coupled fiber optic switch of claim 19 wherein one fiber of each of said pairs of optical fibers is arranged to carry optical signals in one direction and the other fiber of each of said pairs of fibers is arranged to carry optical signals in an opposite direction.

* * * * *